United States Patent
Bringewatt et al.

(10) Patent No.: US 9,909,252 B2
(45) Date of Patent: Mar. 6, 2018

(54) METHOD AND DEVICE FOR SPREADING A LAUNDRY ITEM

(71) Applicant: Herbert Kannegiesser GmbH, Vlotho (DE)

(72) Inventors: Wilhelm Bringewatt, Porta Westfalica (DE); Engelbert Heinz, Vlotho (DE)

(73) Assignee: Herbert Kannegieser GmbH, Vlotho (DE)

(*) Notice: Subject to any disclaimer, the term of this patent is extended or adjusted under 35 U.S.C. 154(b) by 78 days.

(21) Appl. No.: 15/234,594

(22) Filed: Aug. 11, 2016

(65) Prior Publication Data
US 2017/0073881 A1 Mar. 16, 2017

(30) Foreign Application Priority Data

Sep. 10, 2015 (DE) .................. 10 2015 011 602

(51) Int. Cl.
*D06F 67/04* (2006.01)
*D06F 95/00* (2006.01)
(Continued)

(52) U.S. Cl.
CPC .............. *D06F 67/04* (2013.01); *B65G 47/90* (2013.01); *B65H 9/12* (2013.01); *D06C 3/00* (2013.01); *D06F 95/00* (2013.01)

(58) Field of Classification Search
CPC .......... D06F 67/04; D06F 95/00; D06F 93/00; B65G 47/90; B65H 7/02; B65H 9/12; D06C 3/00
See application file for complete search history.

(56) References Cited

U.S. PATENT DOCUMENTS

| 5,546,684 A | * | 8/1996 | Jensen | .................... D06F 67/04 38/143 |
| 9,187,253 B2 | * | 11/2015 | Olivieri | .................. D06F 67/04 |

(Continued)

FOREIGN PATENT DOCUMENTS

| DE | 4143069 A1 | 7/1993 |
| EP | 0523872 A1 | 1/1993 |

(Continued)

OTHER PUBLICATIONS

Deutsches Patent—Und Markenamt (German Patent and Trademark Office), Recherchebericht (search in related application), dated Mar. 3, 2016.

(Continued)

*Primary Examiner* — Ismael Izaguirre
(74) *Attorney, Agent, or Firm* — Laurence P. Colton; Smith Tempel Blaha LLC (57) ABSTRACT

For the purpose of delivering a laundry item (10) to an ironer, the laundry item (10) is spread, by opposite corners of a lateral edge (20), by means of spreader clips (18, 19). In this case, deformations, or "ear formation" may occur at the corner regions (12, 13) of the laundry item (10) that are gripped by the spreader clips (18, 19). This "ear formation" is mostly irreversible, and in the long term results in damage to the laundry items (10). The invention creates a method and a device by which the laundry item (10) is delivered to an ironer in a gentle manner. For this purpose, at least one corner region (12, 13) of the laundry item (10) that is gripped by a spreader clip (18, 19) is captured by an imaging means as the laundry item (10) is being spread.

19 Claims, 4 Drawing Sheets

(51) Int. Cl.
*B65G 47/90* (2006.01)
*B65H 9/12* (2006.01)
*D06C 3/00* (2006.01)

(56) References Cited

U.S. PATENT DOCUMENTS

| | | | | |
|---|---|---|---|---|
| 2008/0295367 A1* | 12/2008 | McCabe | ............... | D06F 67/04 38/143 |
| 2009/0266749 A1* | 10/2009 | Heinz | ............... | D06F 93/00 209/580 |
| 2015/0292142 A1* | 10/2015 | Tautz | ............... | B25J 11/00 414/800 |
| 2016/0145055 A1* | 5/2016 | Sielermann | ............ | B65G 47/90 414/751.1 |

FOREIGN PATENT DOCUMENTS

| | | | |
|---|---|---|---|
| EP | 2784208 A2 | 10/2014 | |
| EP | 3029195 A1 | 6/2016 | |
| FR | 2810347 A1 | 12/2001 | |
| JP | 2008094547 A | * | 4/2008 |
| JP | 2010273732 A | | 12/2010 |
| JP | 2014045801 A | | 3/2014 |
| WO | 2009076958 A1 | | 6/2009 |

OTHER PUBLICATIONS

European Patent Office, Europaischer Recherchenbericht (European Search in a related application), dated Feb. 15, 2017.

* cited by examiner

METHOD AND DEVICE FOR SPREADING A LAUNDRY ITEM

STATEMENT OF RELATED APPLICATIONS

This application claims the benefit of and priority on German Patent Application No. 10 2015 011 602.9 having a filing date of 10 Sep. 2015.

BACKGROUND OF THE INVENTION

Technical Field

The invention relates to a method for spreading a laundry item, the laundry item being gripped at two adjacent corner regions of an edge by at least two spreader clips of a spreader device and spread, before being placed on a feed conveyor or laying strip assigned to the latter, characterized in that at least one corner region of the laundry item that is gripped by a spreader clip is captured by an imaging means as the laundry item is being spread. The invention additionally relates to a device for spreading a laundry item, having at least two spreader clips for holding, respectively, a corner region of the laundry item, the spreader clips being able to be moved apart and towards each other, characterized in that there is an imaging means assigned to each of the spreader clips, for capturing a corner region of the laundry item that is held by a spreader clip.

Prior Art

For the purpose of delivering laundry items, such as so-called flatwork, but also garments, to an ironer or the like, the respective laundry item to be delivered is introduced manually, by opposite corners of a lateral edge, into feed clips of a feeder device. Following subsequent shifting of the feed clips, the laundry item is further transferred to spreader clips of a spreader device. The spreader clips, which each hold a corner region of the opposite corners of the laundry item, are shifted transversely in relation to a delivery direction, such that the respective laundry item is spread out as a result of tautening of an upper edge that extends between the corners held by the clips. The laundry item spread out in such a manner is then placed on a feed conveyor or on a laying strip. From there, the laundry item is delivered to the ironer or the like.

As the spreader clips are spread apart, the laundry item is drawn out at the corner regions associated with an edge, in such a manner that a sag of this edge is minimized. This spreading or opening-out of the laundry item can result in deformations, or "ear formation", at the corner regions of the laundry item that are gripped by the spreader clips. This "ear formation", or enlargement of the corner regions, is mostly irreversible, and in the long term results in damage to the laundry items, or in tearing. Since this deformation of the corner regions can be transferred to the shape of the laundry item as a whole, this results in an unsatisfactory processing result for the laundry item. Apart from the fact that, in the long term, this widening of the laundry item results in destruction of the laundry item, this "ear formation" is undesirable, particularly in the case of flatwork items such as, for example, tablecloths.

BRIEF SUMMARY OF THE INVENTION

The object of the present invention now consists in creating a method and a device, of the type stated at the outset, by means of which efficient delivery of laundry items is ensured, with gentle processing of the laundry items.

A method for achieving this object is a method for spreading a laundry item, the laundry item being gripped at two adjacent corner regions of an edge by at least two spreader clips of a spreader device and spread, before being placed on a feed conveyor or laying strip assigned to the latter, characterized in that at least one corner region of the laundry item that is gripped by a spreader clip is captured by an imaging means as the laundry item is being spread. It is accordingly provided, according to the invention, that at least one corner region of the laundry item that is gripped by a spreader clip is captured by an imaging means as the laundry item is being spread. This capturing of the gripped corner region by the imaging means may be effected continuously or at intervals, at a definable frequency. In this case, it is provided, according to the invention, that only one corner region gripped by a spreader clip is captured by an imaging means, or a plurality of corner regions, each gripped by a spreader clip, are captured by a respective imaging means. The imaging means generates a contour picture of the corner region, a photo or other image of a corner region. The shape, or the ongoing deformation of the at least one corner region gripped by a spreader clip, can thereby be monitored throughout the entire spreading operation.

In particular, the present invention further provides that the corner region captured by the imaging means is compared with predefined references for a corner region, preferably is compared by a control means, and the spreading of the laundry item is stopped as soon as the corner region differs in shape from a predefined reference for a corner region, in particular as soon as the shape of the corner region lies outside a tolerance range of the predefined reference. For this purpose, a multiplicity of possible references for the corner regions are stored on the control means. Depending on requirements for the processing operation, differing tolerance ranges can be defined for each reference. During the spreading operation, the images of the at least one corner region that are captured by the imaging means are compared virtually simultaneously with predefined, or predetermined, references by the control means. If the corner region becomes deformed during the spreading operation to such an extent that it deviates from a predefined reference, the spreading of the laundry item is interrupted by the spreader device.

It may also be provided, however, that references that image the deformed corner regions are stored on the control means. In this case, the spreading of the laundry item is interrupted as soon as an image of the corner regions that is captured by the imaging means matches the references, or falls within a tolerance range of the reference. This avoids widening of the laundry item, or the formation of "ears" that are caused by excessive opening-out, or spreading, of the laundry item and that impair the quality of processing of the laundry item.

Preferably, the present invention may further provide that a distance between an outer edge of the corner region of the laundry item, that is gripped by the spreader clip, and an adjoining lateral edge of the laundry item is determined, in particular this distance is determined by a control means on the basis of images of the corner regions that are captured by the imaging means during the spreading operation, and the spreading of the laundry item is stopped in the case of a limit value being exceeded. The more the laundry item is opened out, the greater is the distance between the outer edge of the corner region and the adjoining lateral edge of the laundry item. According to the invention, a particular distance value may be predefined with a certain tolerance range that can still be tolerated for the spreading of the laundry item. As soon as this predefined value for the distance is exceeded, the control means stops the spreading of the laundry item. This distance, or tolerance range, may be set individually in dependence on the respective laundry item to be spread, or on the size and type or quality of the laundry item.

A further preferred exemplary embodiment of the present invention may provide that a sag of the laundry item is determined, during the spreading operation, by at least one sensor, in particular a sensor strip, which is positioned between two corner regions of an edge of the laundry item that are each gripped by a spreader clip. In this case, the at least one sensor may be positioned in such a manner that, as soon as the latter is covered by the spreading laundry item, the spreading operation is interrupted. In this position, the laundry item is fully, or almost fully, spread out. The use of a sensor strip enables the progress of the spreading operation to be determined, in that the individual sensors on the sensor strip are successively covered by the laundry item. By means of this at least one sensor, or the sensor strip, it is possible to determine the sag of the laundry item, or to determine what the magnitude of the sag may be.

The present invention may further provide that the laundry item is spread by the spreader clips until a predetermined value for the sag of the laundry item is attained, or the at least one corner region of the laundry item that is captured by the imaging means deviates from a predefined reference, or the distance between the outer edge of the captured region and the adjoining lateral edge of the laundry item exceeds a predefined limit value. It is thus possible for various conditions, under which the spreading of the laundry item is interrupted, to be assigned to the method. As soon as one of the said conditions occurs, the spreading of the laundry item is stopped. This prevents "ears" being formed at the corner regions as a result of the spreader clips being moved apart. Equally, it is ensured that the laundry item is spread out fully, when there is no occurrence of widening or "ear formation" at the corner regions.

Furthermore, the present invention may provide that the laundry item may be spread according to a compromise between a predefined value for the sag and a deviation of a shape of a corner region from a reference. Accordingly, a tolerance range, within the scope of which the laundry item may be spread, is provided both for the sag and for the deviation from the reference. A balance is thereby achieved, between a least possible sag and a least possible "ear" formation. As a result of this compromise, the laundry item is spread in an effective manner, but without thereby undergoing excessive strain.

A further advantageous exemplary embodiment of the method may provide that, before the laundry item is spread, its width is determined, and the laundry item is then spread fully by the spreader clips, provided that the at least one corner region of the laundry item that is captured by the imaging means does not deviate from the predefined reference value. For the purpose of determining the width of the laundry item, the lateral edge located between the two corner regions held by the spreader clips may be pressed down, for example by a measuring rod, in such a manner that the laundry item is tensioned between the spreader clips and the measuring rod. The width of the laundry item can then be determined from the positions of the spreader clips and of the measuring rod. Depending on this determined value for the width, the spreader clips are then moved accordingly outwards. If, during this spreading of the laundry item, it is ascertained by the control means that there is a deviation of the corner region from a predefined reference value, the spreading operation is interrupted. In the case of this exemplary embodiment, also, a method is created in which the laundry item is spread out in an effective manner without sustaining lasting damage.

A device for achieving the object on which the invention is based is a device for spreading a laundry item, having at least two spreader clips for holding, respectively, a corner region of the laundry item, the spreader clips being able to be moved apart and towards each other, characterized in that there is an imaging means assigned to each of the spreader clips, for capturing a corner region of the laundry item that is held by a spreader clip. According to the latter, it is provided that there is an imaging means assigned to each of the spreader clips, for capturing a corner region of the laundry item that is held by a spreader clip. This imaging means may be, for example, a digital camera, an array or a matrix of sensors for determining a contour, or a plurality of distance sensors. The imaging means in this case may be assigned directly to the spreader clips, or oriented to a predefined region, at a certain distance.

Preferably, the invention further provides that the imaging means is connected to a control means, on which there are stored a multiplicity of references for a comparison with the corner regions of the laundry item that are gripped by the spreader clips. These references correspond to various corner regions of various laundry items of differing sizes and materials. Depending on the type of laundry item that is being processed, it is thus possible to use corresponding reference shapes.

Further, it may be provided according to the invention that at least one sensor, preferably a sensor strip, for determining a sag of the laundry item is positioned between the spreader clips holding the laundry item, the at least one sensor, preferably the sensor strip, being connected to the control means. These sensors may be, for example, photocells, which generate a signal when shaded.

Furthermore, it may be provided, in particular, that a measuring means for determining the width of the laundry item is positioned between the spreader clips holding the laundry item, the measuring means being connected to the control means. This measuring means may be, for example, a measuring rod, which tensions the edge between the two corner regions held by the spreader clips. The width of the laundry item can be determined from the position of the spreader clips and of the measuring rod.

BRIEF DESCRIPTION OF THE DRAWINGS

A preferred exemplary embodiment of the device according to the invention and of the method is explained in greater detail in the following on the basis of the drawing. In the latter.

DETAILED DESCRIPTION OF PREFERRED EMBODIMENTS

For the purpose of delivering a laundry item 10 to, for example, a feed conveyor, the laundry item 10 is transferred from a feeder device to a spreader device 11. The laundry item 10 is then spread by the spreader device 11, by means of two spreader clips 12, 13, and transferred in this spread state to the feed conveyor.

Figure 1:
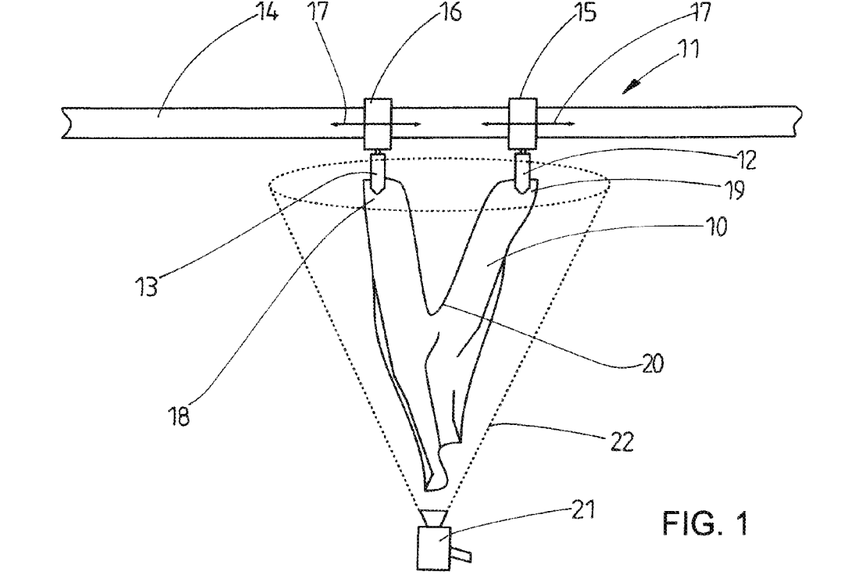
FIG. 1 shows a spreader device, with a laundry item in an initial position.

A spreader device 11 is shown in a highly schematic and simplified representation in FIG. 1. The spreader device 11 has a rail 14, mounted on which there are two slides 15, 16 that can be moved apart and towards each other on the rail 14, along a spreading direction 17. The slides 15, 16 each have a spreader clip 12, 13. By means of these spreader clips 12, 13, the laundry item 10 can be gripped and spread out, in that the slides 15, 16 are moved apart along the rail 14.

In the case of the exemplary embodiment represented in FIG. 1, the spreader clips 12, 13 have gripped the laundry item 10 at two adjacent corner regions 18, 19. In this case, in the initial position represented in FIG. 1, an edge 20 of the laundry item 10 sags downwards between the corner regions 18 and 19. The distance between the lowest point of the edge 20 and a highest point, corresponding to the fully spread laundry item 10, is referred to as a sag of the laundry item 10.

The subject-matter of the present invention consists substantially in capturing at least one of the corner regions 18, 19 by means of an imaging device as the laundry item 10 is being spread. In the case of the exemplary embodiment of the present invention represented in FIG. 1, an upper region of the laundry item 10 that comprises both corner regions 18, 19 is captured by a camera 21. In this case, the image detail of the camera 21 is represented schematically, as a dotted line, by an elliptical truncated cone 22. However, the imaging means according to the invention may also be an array or a matrix of individual sensors, or distance sensors, that generate a signal when an object, or a corner region 18, 19, passes through, such that the contour of the laundry item 10 is imaged as the latter is being spread.

The camera 21 is connected to a control means or the like, not represented. As the laundry item 10 is being spread, the control means continuously generates an image of at least one corner region 18, 19 by means of the camera 21. It is also conceivable, however, for the capturing of the at least one corner region 18, 19 by the camera 21 to be effected at intervals, at a definable frequency. The imaging means, or the camera 21, thus generates a continuous image of the corner regions 18, 19 as the laundry item 10 is being spread.

Figure 2:
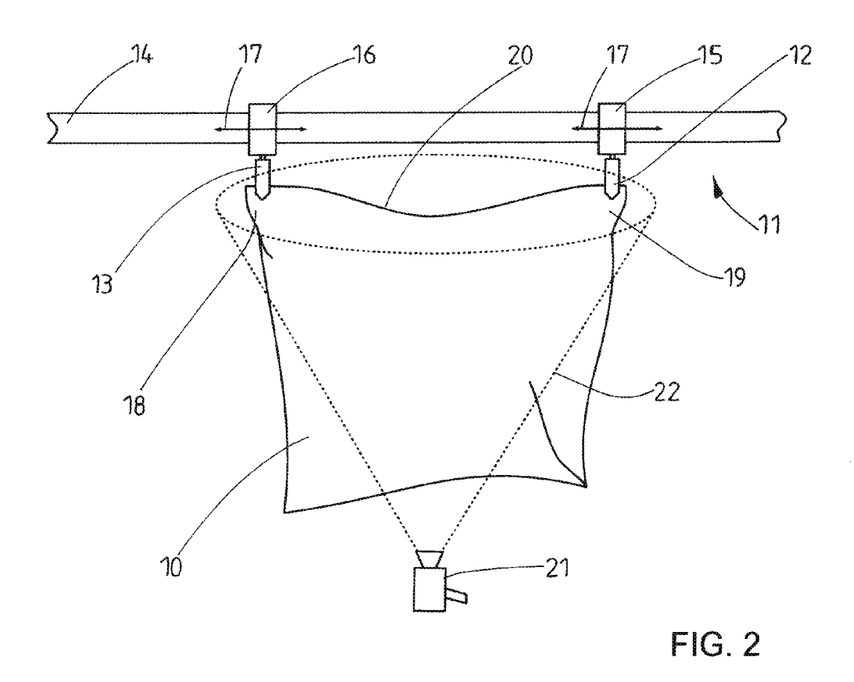
FIG. 2 shows the spreader device, with the partially spread laundry item.
Figure 3:
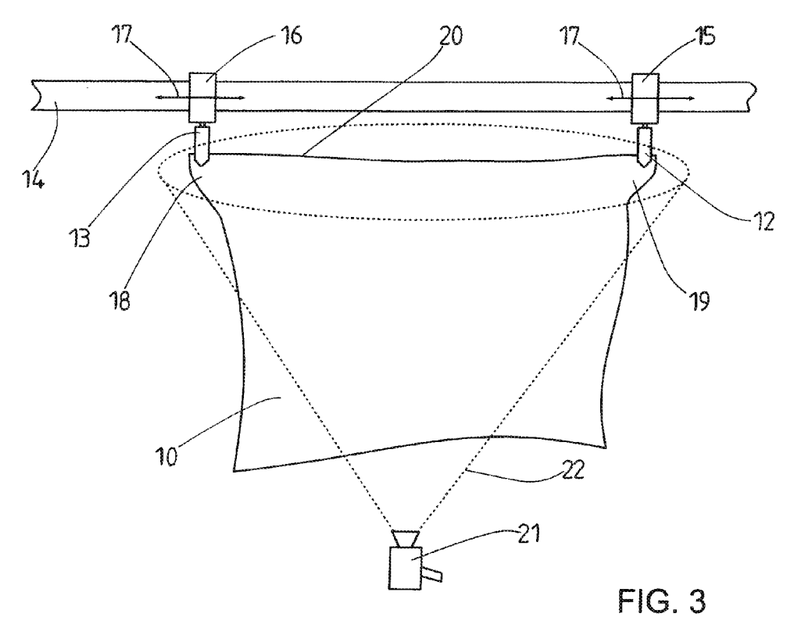
FIG. 3 shows the spreader device according to FIGS. 1 and 2, with a fully spread laundry item.

As a result of the slides 15, 16 being moved apart, the laundry item 10, in particular the edge 20 between the corner regions 18, 19, becomes tensioned, and the entire laundry item 10 is thus spread (FIG. 2). This tensioning of the laundry item 10 can cause the laundry item to deform at the corner regions 18, 19, with respect to its basic rectangular shape. The beginning of this "ear formation" or widening of the corner regions 18, 19 is represented in FIGS. 2 and 3. In FIG. 3, in particular, in which the laundry item 10 is represented as fully spread, the corner regions 18, 19 have been widened significantly in comparison with a rectangular initial shape of the laundry item 10. According to the invention, this widening or "ear formation" at the corner regions 18, 19 is to be avoided, since this can lead to a laundry processing result of lower quality and, in the long term, even damage to the laundry item 10.

In order to prevent this, the images of the corner regions 18, 19 captured by the camera 21 during the spreading operation are compared with reference images. These reference images, or reference shapes of corner regions of various laundry items, are stored on the control unit. These reference shapes represent ideal images of corresponding corner regions. As soon as the images of the corner regions 18, 19 that are captured by the camera 21 deviate from the reference shapes, the process of opening out, or spreading, is stopped. It may also be provided according to the invention that a tolerance range is assigned to the reference shapes, in that a deviation of the captured shape of the corner regions 18, 19 may range, without the spreading operation being interrupted. Thus, in the case of an ascertained deviation of the corner regions 18, 19 from a reference shape, the spreading of the laundry item 10 is interrupted even if the latter has not yet been fully spread. In this way, although the laundry item 10 is transferred in a not fully spread state to the subsequent feeding conveyer, the excessive widening, or the "ear formation" at the corner regions 18, 19 is nevertheless also prevented at the same time.

Figure 4:
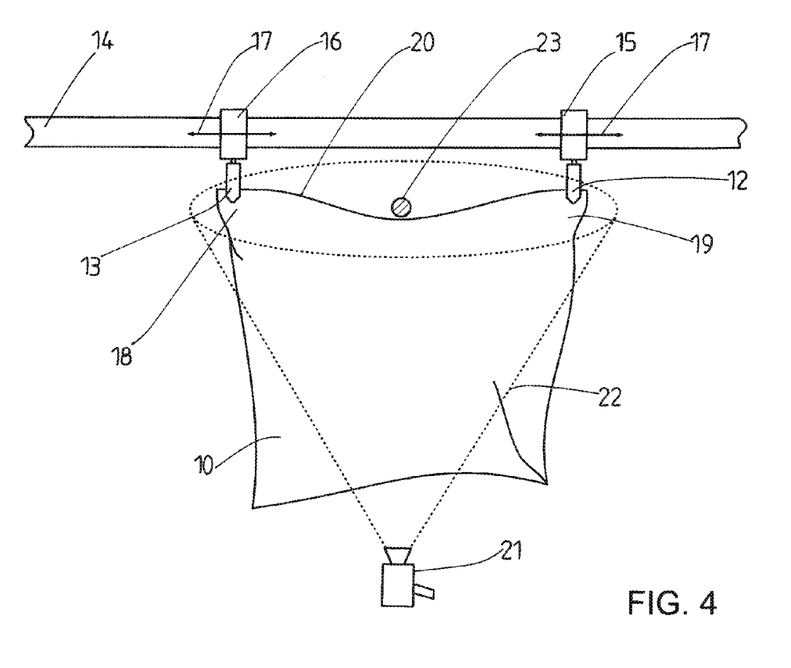
FIG. 4 shows the spreader device according to the preceding figures, with a sensor.

In addition, for the purpose of capturing the corner regions 18, 19 by the camera 21, the sag of the edge 20 can be determined by means of a sensor 23 as the spreader clips 12, 13 are being moved apart (FIG. 4). This sensor 23 is positioned between the two spreader clips 12, 13, and emits a signal, for example to the control means, as soon as it is covered by the edge 20 of the laundry item 10. Positioning of the sensor 23 at differing heights between the spreader clips 12, 13 thus enables a certain sag of the edge 20 to be detected. As soon as the sensor 23 is covered by the edge 20, a signal is generated by the control unit, such that a preset sag of the edge 20 is attained and the spreading of the laundry item 10 can be stopped. If the shape of the corner regions 18, 19 already deviates excessively from a reference shape before a certain sag is attained, a stop signal for the spreading operation is then effected. If the sensor 23 is covered by the edge 20 before excessive widening of the corner regions 18, 19 occurs, the laundry item 10 can be transferred in a sufficiently spread state to the feed conveyor, without the corner regions 18, 19 thereby undergoing excessive strain.

Figure 5:
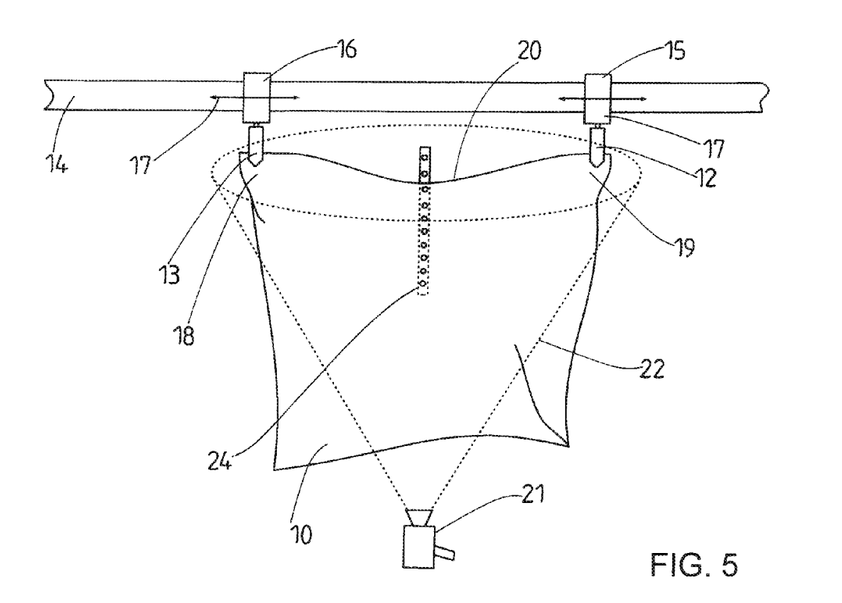
FIG. 5 shows the spreader device according to FIGS. 1 to 3, with a sensor strip.

As an alternative to the sensor 23 represented in FIG. 4, it is also conceivable, according to the invention, for the sag of the edge 20 to be measured by means of a sensor strip 24. By means of this sensor strip 24, which has a multiplicity of individual sensors, the sag of the edge 20 can be determined in a quasi-continuous manner as the spreader clips 12, 13 are moved apart. This quasi-continuous determination of the sag of the laundry item 10 enables the latter to be spread by the control means, according to a predefinable compromise between a sag of the laundry item 10 and a widening of the corner regions 18, 19.

In the event of an excessive widening of the corner regions 18, 19 being ascertained before a required minimum sag of the edge 20 has been attained, it may be provided, according to the invention, that the spreader clips 12, 13 are moved further apart from each other, within a tolerance range for the widening of the corner regions 18, 19, in order to fulfil predefinable minimum requirements for the sag. As a result of such a compromise, it is also still possible to transfer to the feed conveyor laundry items 10 on which a widening of the corner regions 18, 19 is already far advanced. If the widening of the corner regions 18, 19 also exceeds the acceptable tolerance range, the laundry item 10 is to be separated out. If the minimally required sag is attained before a widening of the corner regions 18, 19, there is no compromise to be made. Such conditions, or selection criteria, may be specified via the control means.

Figure 6:
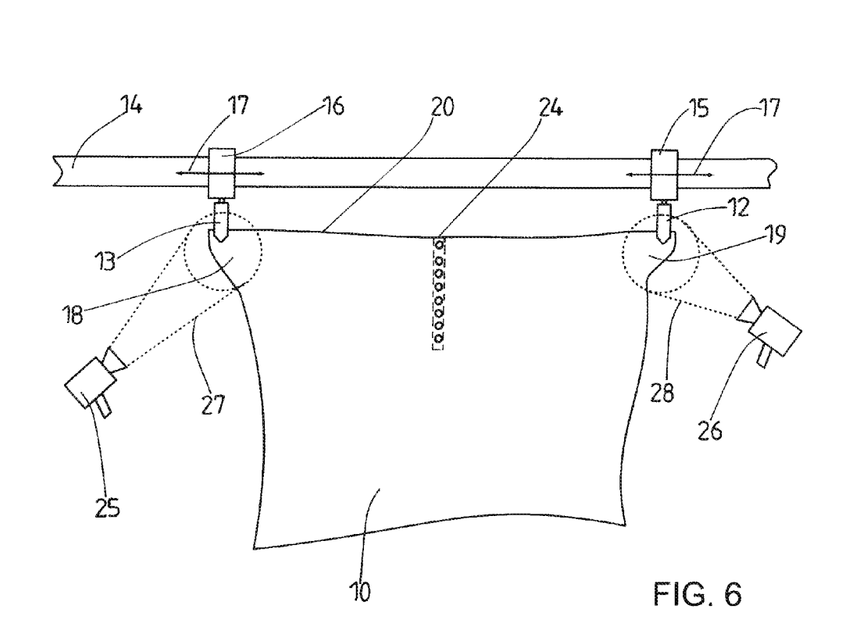
FIG. 6 shows the spreader device according to the preceding figures, with two imaging means.

As an alternative to the capturing of the corner regions 18, 19 by a single camera 21, it may also be provided, according to the invention, that each corner region 18, 19 is captured by a single camera 25, 26. In the case of the exemplary embodiment of the present invention represented in FIG. 6, the field of view of the cameras 25, 26 is in each case represented schematically by a dotted-line truncated cone 27, 28. In the case of this exemplary embodiment, only the corner region 18 or 19 of the complete laundry item 10 is captured and examined for any widenings of the corner regions 18, 19. Moreover, it may be provided that differing conditions may be stipulated for the two corner regions 18, 19 with respect to the widening, or the widenings at the corner regions 18, 19 may differ greatly.

Figure 7:
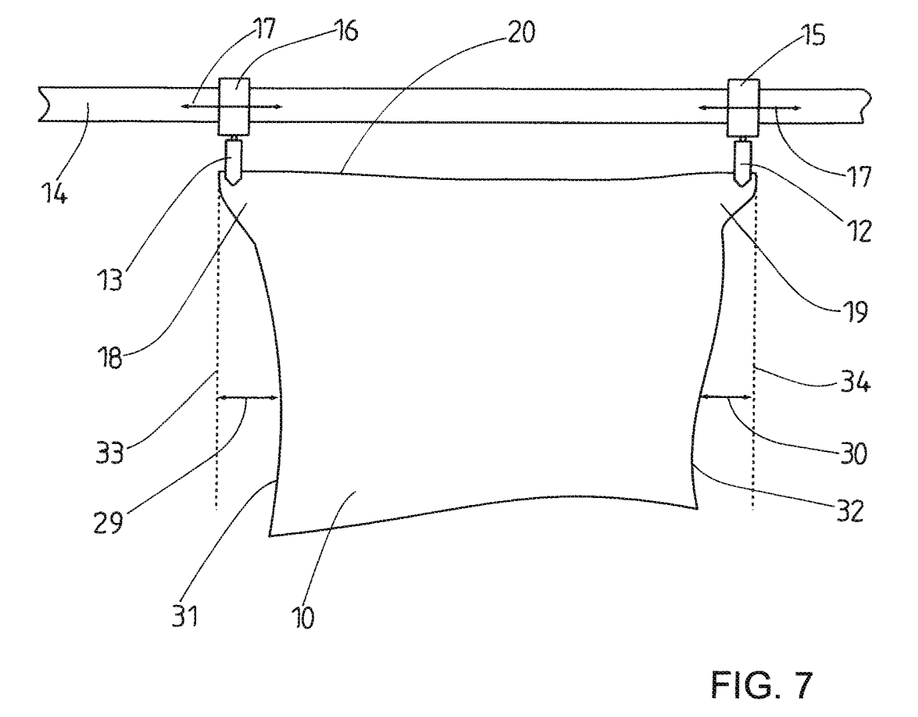
FIG. 7 shows the spreader device according to a further exemplary embodiment.

A further exemplary embodiment of the present invention may provide that the widening of the corner regions 18, 19 is determined by determination of the distances 29, 30 between an outer edge of the corner regions 18, 19 and adjoining lateral edges 31, 32 of the laundry item 10 (FIG. 7). For this purpose, just as in the case of the preceding exemplary embodiments, the corner regions 18, 19 and, additionally, the lateral edges 31, 32 are captured in pairs, or together, by an imaging means, not represented. This imaging means may again be a camera 21 or an array or a matrix of individual sensors. The distance 30, 31 between the lateral edges 31, 32 and an auxiliary line 33, 34, extending vertically downwards from the corner regions 18, 19, is then determined by the control means. As soon as a value for the distance 29 and/or for the distance 30 deviates from a predefinable limit value, or is exceeded, the spreading operation is interrupted. Since the value of the distance 29, 30 represents a direct measure of the degree of widening of the corner regions 18, 19, this method offers a possibility for avoiding "ear formation", in a manner that is as efficient as the previously explained exemplary embodiment. Moreover, clearly, it is likewise conceivable for this determination of distance to be effected in combination with a sensor 23 or a sensor strip 24 for determining the sag.

LIST OF REFERENCES 10 laundry item
11 spreader device
12 spreader clip
13 spreader clip
14 rail
15 slide
16 slide
17 spreading direction
18 corner region
19 corner region
20 edge
21 camera
22 truncated cone
23 sensor
24 sensor strip
25 camera
26 camera
27 truncated cone
28 truncated cone
29 distance
30 distance
31 lateral edge
32 lateral edge
33 auxiliary line
34 auxiliary line

What is claimed is:

1. A method for spreading a laundry item (10), the laundry item (10) being gripped at two adjacent corner regions (18, 19) of an edge (20) by at least two spreader clips (12, 13) of a spreader device (11) and spread, before being placed on a feed conveyor or laying strip assigned to the latter, wherein at least one corner region (18, 19) of the laundry item (10) that is gripped by a spreader clip (12, 13) is captured by an imaging means as the laundry item (10) is being spread.

2. The method according to claim 1, wherein the corner region (18, 19) captured by the imaging means is compared with predefined references for a corner region (18, 19).

3. The method according to claim 1, wherein the corner region (18, 19) captured by the imaging means is compared with predefined references for a corner region (18, 19) by a control means.

4. The method according to claim 1, wherein the spreading of the laundry item (10) is stopped as soon as the corner region (10) differs in its shape from a predefined reference for a corner region (18, 19).

5. The method according to claim 1, wherein the spreading of the laundry item (10) is stopped as soon as the shape of the corner region (10) lies outside a tolerance range of a predefined reference.

6. The method according to claim 1, wherein a distance (29, 30) between an outer edge of the corner region (18, 19) of the laundry item (10), that is gripped by the spreader clip (12, 13), and an adjoining lateral edge (31, 32) of the laundry item (10) is determined.

7. The method according to claim 6, wherein the distance (29, 30) is determined by a control means on the basis of images of the corner regions (18, 19) that are captured by the imaging means during the spreading operation, and the spreading of the laundry item (10) is stopped in the case of a limit value being exceeded.

8. The method according to claim 1, wherein a sag of the laundry item (10) is determined, during the spreading operation, by at least one sensor (23), which is positioned between two corner regions (18, 19) of an edge (20) of the laundry item (10) that are each gripped by a spreader clip (12, 13).

9. The method according to claim 1, wherein the laundry item (10) is spread by the spreader clips (12, 13) until a predetermined value for the sag of the laundry item (10) is attained.

10. The method according to claim 1, wherein the laundry item (10) is spread by the spreader clips (12, 13) until the at least one corner region (18, 19) of the laundry item (10) that is captured by the imaging means deviates from a predefined reference.

11. The method according to claim 1, wherein the laundry item (10) is spread by the spreader clips (12, 13) until the distance (29, 30) between the outer edge of the captured corner region and the adjoining lateral edge (31, 32) of the laundry item (10) exceeds a predefined limit value.

12. The method according to claim 1, wherein the laundry item (10) is spread according to a compromise between a predefined value for the sag and a deviation of a shape of a corner region (18, 19) from a reference.

13. The method according to claim 1, wherein, before the laundry item (10) is spread, its width is determined, and the laundry item (10) is then spread fully by the spreader clips (12, 13), provided that the at least one corner region (18, 19) of the laundry item (10) that is captured by the imaging means does not deviate from the predefined reference value.

14. A device for spreading a laundry item (10), having at least two spreader clips (12, 13) for holding, respectively, a corner region (18, 19) of the laundry item (10), the spreader clips (12, 13) being able to be moved apart and towards each other, characterized in that there is an imaging means assigned to each of the spreader clips (12, 13), for capturing a corner region (18, 19) of the laundry item (10) that is held by a spreader clip (12, 13).

15. The device according to claim 14, wherein the imaging means is connected to a control means, on which there are stored a multiplicity of references for a comparison with the corner regions (18, 19) of the laundry item (10) that are gripped by the spreader clips (12, 13).

16. The device according to claim 15, wherein at least one sensor (23) for determining a sag of the laundry item (10) is positioned between the spreader clips (12, 13) holding the laundry item (10), the at least one sensor (23) being connected to the control means.

17. The device according to claim 14, wherein the imaging means is configured as at least one camera (21, 25, 26).

18. The device according to claim 14, wherein the imaging means is an arrangement of individual sensors.

19. The device according to claim 15, wherein a measuring means for determining the width of the laundry item (10) is positioned between the spreader clips (12, 13) holding the laundry item (10), the measuring means being connected to the control means.

* * * * *

UNITED STATES PATENT AND TRADEMARK OFFICE
CERTIFICATE OF CORRECTION

PATENT NO.       : 9,909,252 B2
APPLICATION NO.  : 15/234594
DATED            : March 6, 2018
INVENTOR(S)      : Wilhem Bringewatt et al.

Page 1 of 1

It is certified that error appears in the above-identified patent and that said Letters Patent is hereby corrected as shown below:

On the Title Page

The (73) Assignee "Herbert Kannegeiser GmbH, Vlotho (DE)" should read --(73) Assignee: Herbert Kannegeisser GmbH, Vlotho (DE)--.

Signed and Sealed this
Seventeenth Day of April, 2018

Andrei Iancu
*Director of the United States Patent and Trademark Office*

UNITED STATES PATENT AND TRADEMARK OFFICE
CERTIFICATE OF CORRECTION

PATENT NO. : 9,909,252 B2  
APPLICATION NO. : 15/234594  
DATED : March 6, 2018  
INVENTOR(S) : Wilhelm Bringewatt and Engelbert Heinz Page 1 of 1

It is certified that error appears in the above-identified patent and that said Letters Patent is hereby corrected as shown below:

On the Title Page

Item (73), Assignee "Herbert Kannegieser GmbH, Vlotho (DE)" should read --(73) Assignee: Herbert Kannegiesser GmbH, Vlotho (DE)--.

This certificate supersedes the Certificate of Correction issued October 11, 2016.

Signed and Sealed this  
Tenth Day of November, 2020

Andrei Iancu  
*Director of the United States Patent and Trademark Office*